US009705669B2

(12) United States Patent
Hirayama et al.

(10) Patent No.: US 9,705,669 B2
(45) Date of Patent: Jul. 11, 2017

(54) SIGNAL PROCESSING DEVICE, SIGNAL PROCESSING METHOD, AND PROGRAM

(71) Applicant: Saturn Licensing LLC, New York, NY (US)

(72) Inventors: Yuichi Hirayama, Chiba (JP); Satoshi Okada, Tokyo (JP); Yuichi Mizutani, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 14/759,888

(22) PCT Filed: Jan. 15, 2014

(86) PCT No.: PCT/JP2014/050496
§ 371 (c)(1),
(2) Date: Jul. 8, 2015

(87) PCT Pub. No.: WO2014/115608
PCT Pub. Date: Jul. 31, 2014

(65) Prior Publication Data
US 2015/0349947 A1 Dec. 3, 2015

(30) Foreign Application Priority Data

Jan. 25, 2013 (JP) ................. 2013-012673

(51) Int. Cl.
*H04L 7/10* (2006.01)
*H04L 7/04* (2006.01)
(Continued)

(52) U.S. Cl.
CPC ............. *H04L 7/10* (2013.01); *G09G 5/00* (2013.01); *H04B 1/16* (2013.01); *H04L 7/033* (2013.01);
(Continued)

(58) Field of Classification Search
CPC H04L 7/10; H04L 7/048; H04L 7/033; H04N 21/4302; H04B 1/16
See application file for complete search history.

(56) References Cited

U.S. PATENT DOCUMENTS 5,956,376 A * 9/1999 Nakaya ............... H04B 1/28
375/340
6,225,926 B1 5/2001 Hayase
(Continued)

FOREIGN PATENT DOCUMENTS

EP 1 665 775 B1 6/2006
EP 1 821 542 A2 8/2007
(Continued)

OTHER PUBLICATIONS

"C1 Plus Specification, Content Security Extensions to the Common Interface" v1.3.1 (Nov. 2011), C1 Plus LLC Pannell House, Surrey England.
(Continued)

*Primary Examiner* — Jean B Corrielus
(74) *Attorney, Agent, or Firm* — Michael Best & Friedrich LLP

(57) ABSTRACT

Provided is a signal processing device including: a valid clock width calculation unit configured to calculate a valid clock width corresponding to a bit rate of a valid section in which a transport stream (TS) packet exists; and a TS clock signal generation unit configured to generate, on a basis of the valid clock width calculated by the valid clock width calculation unit, a TS clock signal by combining clocks with different frequency dividing rates.

13 Claims, 10 Drawing Sheets

(51) Int. Cl.
*H04B 1/16* (2006.01)
*H04L 7/033* (2006.01)
*H04N 21/43* (2011.01)
*G09G 5/00* (2006.01)
*H04N 5/06* (2006.01)

(52) U.S. Cl.
CPC .............. *H04L 7/048* (2013.01); *H04N 5/06* (2013.01); *H04N 21/4302* (2013.01)

(56) References Cited

U.S. PATENT DOCUMENTS

| | | | | |
|---|---|---|---|---|
| 6,914,851 | B1* | 7/2005 | Kiehl | G11C 7/1066 365/189.03 |
| 8,610,475 | B2* | 12/2013 | Kim | H03L 7/0816 327/147 |
| 2001/0046241 | A1* | 11/2001 | Shimosakoda | H04J 3/0658 370/509 |
| 2003/0007222 | A1* | 1/2003 | Kwasaki | H03L 7/091 398/202 |
| 2004/0172570 | A1 | 9/2004 | Miyajiri | |
| 2008/0112438 | A1 | 5/2008 | Ying et al. | |
| 2008/0265961 | A1 | 10/2008 | Endo | |
| 2009/0040082 | A1* | 2/2009 | Hinz | G11C 7/1051 341/100 |
| 2009/0324215 | A1* | 12/2009 | Yin | H04J 3/0688 398/2 |
| 2010/0045355 | A1 | 2/2010 | Endo | |
| 2013/0033947 | A1* | 2/2013 | Passerini | G11C 29/023 365/194 |

FOREIGN PATENT DOCUMENTS

| | | |
|---|---|---|
| JP | 2000-004219 A | 1/2000 |
| JP | 2002-158646 A | 5/2002 |
| JP | 2008-295035 A | 12/2008 |
| JP | 2013-247542 A | 12/2013 |
| WO | WO-2010/029079 A1 | 3/2010 |

OTHER PUBLICATIONS

International Search Report; International Application No. PCT/2014/050496; Filed: Jan. 15, 2014. (Form PCT/ISA/210).

Extended European Search Report issued Aug. 9, 2016 for corresponding European Application No. 14742738.6.

* cited by examiner

SIGNAL PROCESSING DEVICE, SIGNAL PROCESSING METHOD, AND PROGRAM

TECHNICAL FIELD

The present technique relates to a signal processing device, a signal processing method, and a program and, particularly, relates to a signal processing device, a signal processing method, and a program that are capable of generating a TS clock with high resolution corresponding to a data rate of a transport stream (TS).

BACKGROUND ART

For example, in digital broadcasting, pictures (moving pictures) and the like are encoded with a predetermined encoding method such as Moving Picture Experts Group (MPEG) and a broadcast wave including a TS constituted by transport stream (TS) packets, which is the resulting encoded data arranged in the payload, is transmitted.

Demodulation and error correction of the broadcasting wave are performed in a receiver that receives digital broadcasting such that the TS is restored and output.

Signals that are output from a large-scale integration (LSI) that performs error correction in the receiver includes the TS, a TS clock signal that indicates the timing of the TS, and the like.

Incidentally, the TS and the like that is output from the LSI, which performs error correction, are supplied to a module (hereinafter, also referred to as a TS processing module) that receives the TS and the like and that is connected to a subsequent stage of the LSI. Accordingly, the LSI, which performs error correction, needs to output a TS and the like that meet the specifications that the TS processing module connected to the subsequent stage can accept.

Standards specifying the interface of a TS processing module includes, for example, Digital Video Broadcasting-Common Interface Plus (DVB-CI Plus) (Non-Patent Literature 1).

In the DVB-CI Plus standard, "K.1.7.5 Common Interface MPEG Signal Timing" specifies the specifications of the TS clock signal.

Now, the specifications of the TS clock signal specified in the DVB-CI Plus standard may, hereinafter, also be referred to as AC specifications (AC spec).

CITATION LIST

Non-Patent Literature

Non-Patent Literature 1: CI Plus Specification v1.3.1 (2011-10)

SUMMARY OF INVENTION

Technical Problem

Incidentally, when conventionally outputting a TS from a TS interface of an LSI, in the parallel clock, in order to meet the DVB-CI Plus standard, a TS clock signal with a duty of 50% (a high/low rate of the TS clock signal) that is determined from the TS bit rate is output. Furthermore, in order to meet the same standard, in the serial clock, in order to reduce noise in receiving the RF, TS clock signals of fixed divisions such as 2, 3, 4 of the operating clock are selected and output.

However, in the parallel clock, since only a division at a duty of 50% has been performed in the operating clock and, further, in the serial clock, only limited division modes are prepared in the operating clock, there is the risk of the resolution of the average frequency of the output TS clock signal becoming coarse in either cases.

Meanwhile, a device connected to the TS interface requires, in accordance with the TS bit rate, the average frequency of the TS clock signal to have more resolution and a TS clock signal having a lowest possible average frequency with respect to the TS bit rate to be input.

As a result, measures towards a TS clock signal with an average frequency having a finer resolution than before with respect to the TS bit rate are required.

The present technique has been made in view of the above situation and, in particular, enables a TS clock signal, formed of a serial clock signal and a parallel clock signal, that corresponds to an average frequency that has, with respect to a TS bit rate, a higher resolution and that is closer to the TS bit rate, to be output.

Solution to Problem

According to an aspect of the present technique, there is provided a signal processing device including: a valid clock width calculation unit configured to calculate a valid clock width corresponding to a bit rate of a valid section in which a transport stream (TS) packet exists; and a TS clock signal generation unit configured to generate, on a basis of the valid clock width calculated by the valid clock width calculation unit, a TS clock signal by combining clocks with different frequency dividing rates.

The TS clock signal generation unit can include a parallel clock signal generation unit configured to generate, on a basis of the valid clock width, a parallel clock signal by combining the clocks with different frequency dividing rates, and a serial clock signal generation unit configured to generate, on a basis of a parallel clock width of a level H section or a level L section of a parallel clock signal that has been generated by the parallel clock signal generation unit, a serial clock signal by combining the clocks with different frequency dividing rates.

On a basis of a value of a decimal section of a clock number of an operating clock signal indicating the valid clock width, the parallel clock signal generation unit can generate a parallel clock signal by combining a clock signal of a clock number corresponding to an integer section of the clock number of the operating clock signal and a clock signal in which a clock number of a predetermined integer is added to or subtracted from the integer section of the clock number of the operating clock signal. On a basis of a remainder obtained when a clock number of an operating clock signal of a parallel clock width of a level H section or a level L section of a parallel clock signal that has been generated by the parallel clock signal generation unit is divided by a predetermined integer, the serial clock signal generation unit can generate a serial clock signal by combining a clock signal of a clock number that is to be an integer section of a quotient obtained when the clock number of the operating clock signal of the parallel clock width of the level H section or the level L section of the parallel clock signal is divided by the predetermined integer, and a clock signal of a clock number in which a clock number of a predetermined integer is added to or subtracted from the integer section of the quotient obtained when the clock number of the operating clock signal of the parallel clock width of the level H section or the level L section of the parallel clock signal is divided by the predetermined integer.

According to an aspect of the present technique, there is provided a signal processing method including the steps of: performing valid clock width calculation processing of calculating a valid clock width corresponding to a bit rate of a valid section in which a transport stream (TS) packet exists; and performing TS clock signal generation processing of generating, on a basis of the valid clock width calculated by the valid clock width calculation processing, a TS clock signal by combining clocks with different frequency dividing rates.

According to an aspect of the present technique, there is provided a program configured to cause a computer to execute processing including: a valid clock width calculation step of calculating a valid clock width corresponding to a bit rate of a valid section in which a transport stream (TS) packet exists; and a TS clock signal generation step of generating, on a basis of the valid clock width calculated by the valid clock width calculation step, a TS clock signal by combining clocks with different frequency dividing rates.

In an aspect of the present technique, a valid clock width corresponding to a bit rate of a valid section in which a transport stream (TS) packet exists is calculated, and, on the basis of the calculated valid clock width, a TS clock signal is generated by combining clocks with different frequency dividing rates.

A signal processing device according to an aspect of the present technique may be an individual device or may be a block performing processes.

Advantageous Effects of Invention

An aspect of the present disclosure enables a TS clock signal formed of a serial clock signal and a parallel clock signal corresponding to an average frequency that, with respect to a TS bit rate, has a higher resolution and that is closer to the TS bit rate to be output.

DESCRIPTION OF EMBODIMENTS

<A Receiving System to which the Present Technique is Applied>

Figure 1:
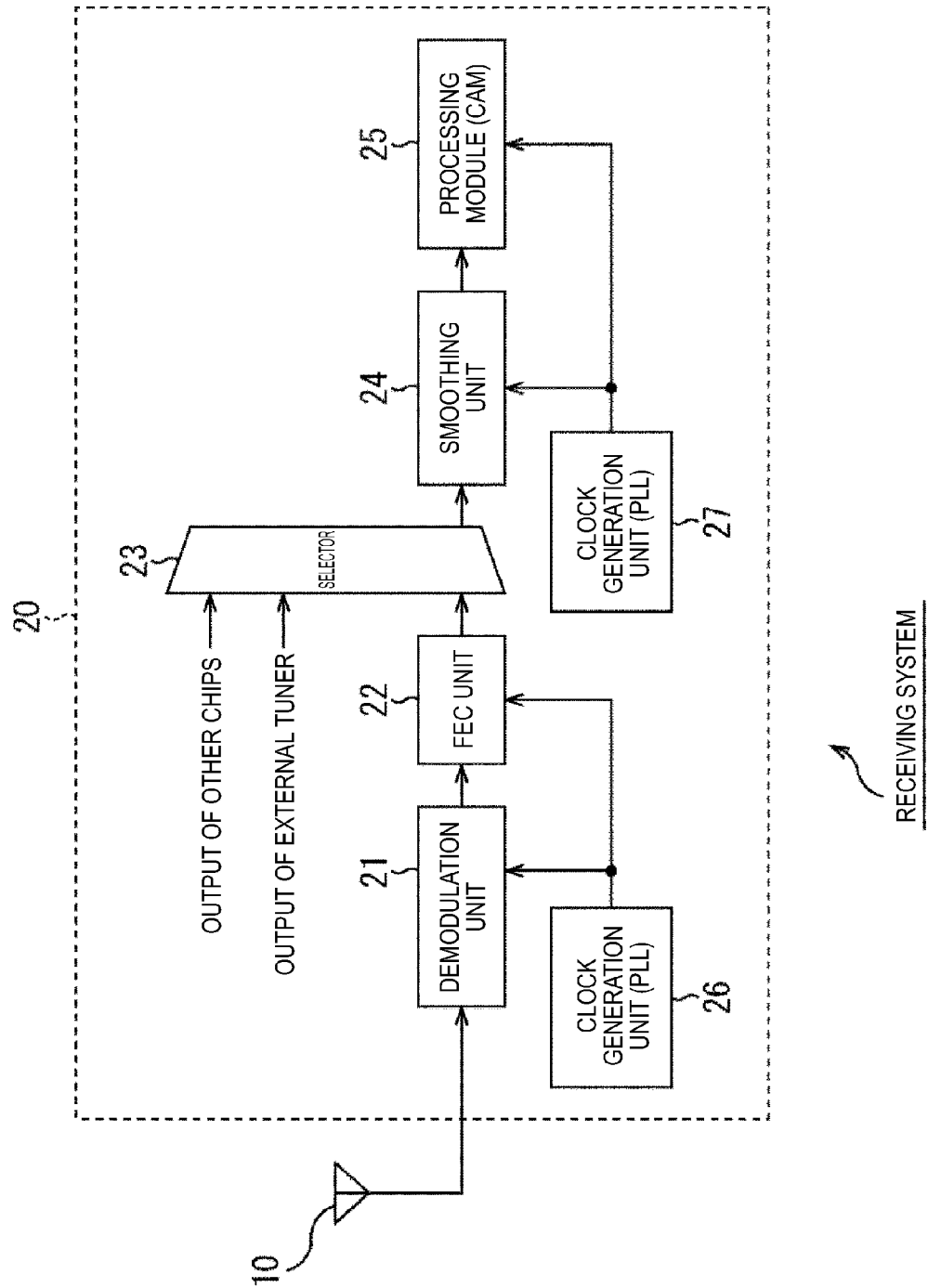
FIG. 1 is a block diagram illustrating an exemplary configuration of an embodiment of a receiving system to which a signal processing device according to the present technique is applied.

FIG. 1 is a block diagram illustrating an exemplary configuration of a receiving system to which the present technique is applied.

The receiving system of FIG. 1 receives digital broadcasting, for example.

In other words, in FIG. 1, the receiving system includes an antenna 10 and a receiver 20.

The antenna 10, for example, receives a broadcast wave of digital broadcasting including a TS and supplies the received signal resulting from the reception to the receiver 20.

The receiver 20 restores and processes the TS from the received signal that is from the antenna 10.

In other words, the receiver 20 includes a demodulation unit 21, a forward error correction (FEC) unit 22, a selector 23, a smoothing unit 24, a processing module 25, and a clock generation units 26 and 27.

The demodulation unit 21 demodulates the received signal that is from the antenna 10 and supplies the resulting demodulated signal to the FEC unit 22.

The FEC unit 22 performs error correction on the demodulated signal that is from the demodulation unit 21 and supplies the resulting signal such as a TS to the selector 23.

The TS sync signal, the TS valid signal, the data signal, and the TS clock signal that are output signals output from the FEC unit 22 are supplied to the selector 23. A TS sync signal, a TS valid signal, a data signal, and a TS clock signal that are output signals output from the external tuner (not shown) and TS sync signals, TS valid signals, data signals, and TS clock signals that are output signals output from other chips (not shown) are further supplied to the selector 23.

The selector 23 selects either one of the output signal of the FEC unit 22, the output signal of the external tuner, and the output signals of the other chips in accordance with, for example, an operation of a user and supplies the selected output signal to the smoothing unit 24.

Similar to the processing module 25, the smoothing unit 24 operates in accordance with the operating clock signal generated by the clock generation unit 27.

An output signal of the clock signal is supplied to the smoothing unit 24 from the selector 23.

The smoothing unit 24 generates a clock signal, the period of which is averagely uniformized by smoothing the TS clock signal included in the output signal that is from the selector 23, as a shaped TS clock signal that is a TS clock signal to which shaping has been performed.

Moreover, together with the shaped TS clock signal, the smoothing unit 24 supplies, to the processing module 25, the signals that are in synchronization with the shaped TS clock signal, namely, the TS (data signal), the TS sync signal, and the TS valid signal that are included in the output signal that is from the selector 23.

The processing module 25 is a TS processing module that performs processing on the TS.

Now, as regards the TS processing module, there is a module such as a conditional access module (CAM) that performs descrambling and the like on the TS and that is attachable and detachable to and from the receiver 20. When the processing module 25 is a CAM, signals such as the TS that are output from the FEC unit 22 needs to meet the AC spec and the like that is specified by the DVB-CI Plus standard.

The clock generation unit 26 is, for example, constituted by a phase lock loop (PLL) and generates an operating clock signal, which is a clock signal for operating the demodulation unit 21 and the FEC unit 22 that constitute the receiver 20, and supplies the operating clock signal to the demodulation unit 21 and the FEC unit 22. The demodulation unit 21 and the FEC unit 22 operate according to the operating clock signal supplied from the clock generation unit 26.

Similar to the clock generation unit 26, for example, the clock generation unit 27 is constituted by a PLL, generates an operating clock signal for operating the smoothing unit 24 and the processing module 25, and supplies the generated operating clock signal to the smoothing unit 24 and the processing module 25.

Accordingly, the demodulation unit 21 and the FEC unit 22 operate according to the operating clock signal generated by the clock generation unit 26, and the smoothing unit 24 and the processing module 25 operate according to the operating clock signal generated by the clock generation unit 27.

Note that the demodulation unit 21 and the FEC unit 22, and the smoothing unit 24 and the processing module 25 may all be operated according to the same operating clock signal.

<Example of Signals Output from FEC22>

Figure 2:
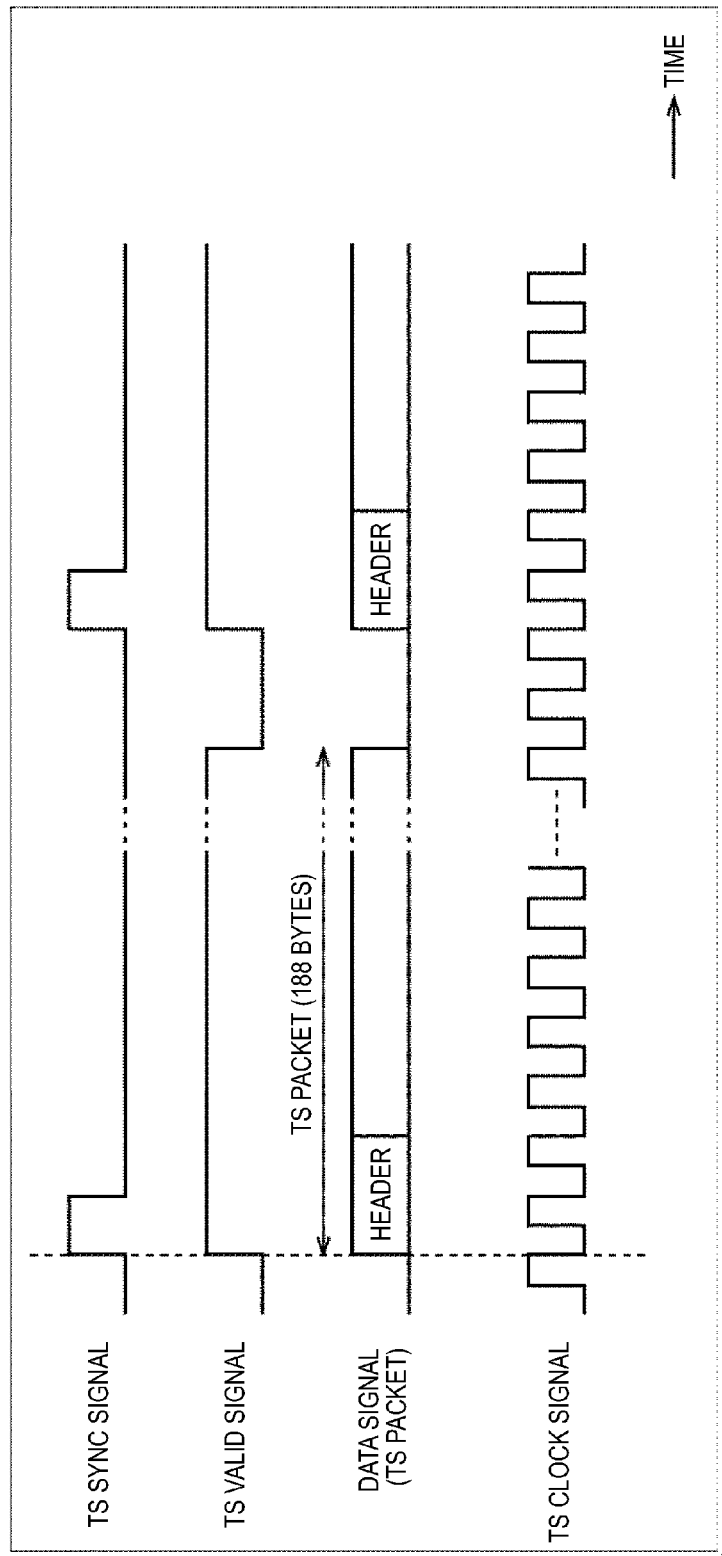
FIG. 2 is a diagram illustrating exemplary signals that an FEC unit outputs.

FIG. 2 is a diagram illustrating exemplary signals that the FEC unit 22 outputs.

FEC unit 22 outputs a TS sync signal, a TS valid signal, a data signal, and a TS clock signal.

The TS sync signal indicates the timing of the head of each TS packet included in the TS. The TS sync signal, for example, temporarily turns into level H (High) from level L (Low) only at the timing of the head of each TS packet.

The TS valid signal indicates sections (valid sections) in the TS in which the TS packets exist. The TS valid signal, for example, turns into level H in the valid sections and turns into level L in sections other than the valid sections. In other words, the TS valid signal turns into level H in the sections between the head to the end of each TS packet and turns into level L at other sections.

The data signal is a signal of the TS and includes the TS packets. The TS packets are each a packet having a data length (a packet length) of 188 bytes, the first 4 bytes of which are headers.

The TS clock signal is a signal indicating the timings of the data constituting the TS. The TS clock signal is a pulse-like signal that alternates between level L and level H.

For example, if, at this moment, the FEC unit 22 outputs TS packets (data signal) in parallel in units of 8 bits (parallel), a single period of a TS clock signal (a single pulse of the TS clock signal) will indicate an 8-bit timing of the TS packets that are output in parallel from the FEC unit 22.

Note that other than the TS (data signal), the TS sync signal and the TS valid signal are also signals that have been synchronized with the TS clock signal.

In other words, the TS sync signal and the TS valid signal are both signals whose level changes according to the timing of the falling edge of the TS clock signal, for example.

Now, since the FEC unit 22 operates in accordance with the operating clock signal generated by the clock generation unit 26, either of the TS sync signal, the TS valid signal, the data signal, and the TS clock signal are signals that are synchronized with the operating clock signal generated by the clock generation unit 26 (a signal whose level changes in accordance with the timing of the edge of the operating clock signal and in which the minimum granularity of the level change is the period of the operating clock signal).

While the FEC unit 22 outputs the TS sync signal, the TS valid signal, the data signal, and the TS clock signal that are described above, there are cases in which the TS clock signal does not meet the AC spec required by the processing module 25 of the subsequent stage when a jitter is generated in the TS clock signal output from the FEC unit 22.

<AC Spec>

Figure 3:
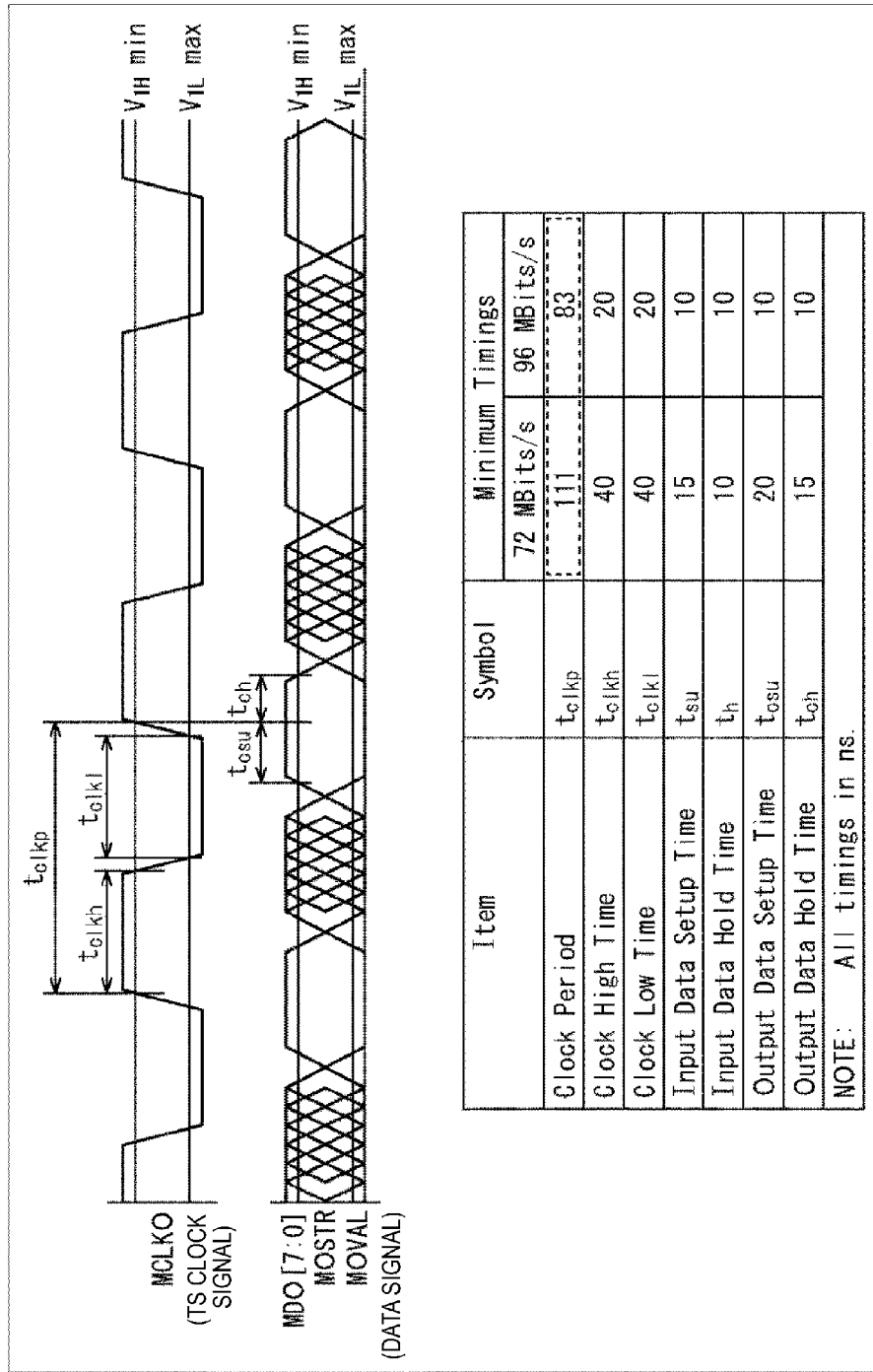
FIG. 3 is a diagram for describing the AC spec.

FIG. 3 is a diagram for describing the AC spec.

Referring to FIG. 3, Tclkp is the smallest clock width of the TS clock signal, in other words, Tclkp indicates a minimum clock width that is the minimum time value from a rising edge (falling edge) to the next rising edge (falling edge).

Furthermore, Tclkh indicates a minimum H level section, which is the minimum value of the level H section (time) of the TS clock signal (of a single period), and Tclkl indicates a minimum level L section, which is a minimum value of the level L section of the TS clock signal.

The AC spec specifies 96 Mbps and 72 Mbps as the upper limit of the bit rate of the TS, and the minimum clock width Tclkp, the minimum level H section Tclkh, and the minimum level L section Tclkl are each specified separately for (a TS of) 96 Mbps or lower and for (a TS of) 72 Mbps or lower.

In other words, it is specified that when lower than or equal to 96 Mbps, the minimum clock width Tclkp needs to be 83 nano seconds (ns) or longer, and the minimum level H section Tclkh and the minimum level L section Tclkl both need to be 20 ns or longer.

Furthermore, it is specified that when lower than or equal to 72 Mbps, the minimum clock width Tclkp needs to be 111 ns or longer, and the minimum level H section Tclkh and the minimum level L section Tclkl both need to be 40 ns or longer.

Now, when the TS packets are output in parallel in units of 8 bits (parallel) as described in FIG. 2 and when the data rate of the TS is 96 Mbps, the clock width (period) of the TS clock signal that indicates the timing of the TS packet in units of 8 bits needs to be 1/(96 Mbps/8 bits)=83.333 . . . ns or shorter.

Furthermore, when the data rate of the TS is 72 Mbps, the clock width of the TS clock signal needs to be 1/(72 Mbps/8 bits)=111.111 . . . ns or shorter.

As described above, 83.333 . . . ns and 111.111 . . . ns that are the clock widths that are physically required in the TS clock signal are extremely close to 83 ns and 111 ns that are the minimum clock width Tclkp required in the AC spec.

Accordingly, when a jitter is generated in the output signal of the clock signal that is from the selector 23, the clock width of the TS clock signal included in the output signal becomes shorter than 83 ns and 111 ns that are specified in the AC spec as the minimum clock width Tclkp rendering it difficult to meet the AC spec.

The smoothing unit 24 generates a clock signal, the period of which is uniformized by smoothing the TS clock signal included in the output signal that is from the selector 23, as a shaped TS clock signal that is a TS clock signal to which shaping has been performed.

Moreover, together with the shaped TS clock signal, the smoothing unit 24 supplies, to the processing module 25, the signals that are in synchronization with the shaped TS clock signal, namely, the TS (data signal), the TS sync signal, and the TS valid signal that are included in the output signal that is from the selector 23.

<Exemplary Configuration of the Smoothing Unit 24>

Figure 4:
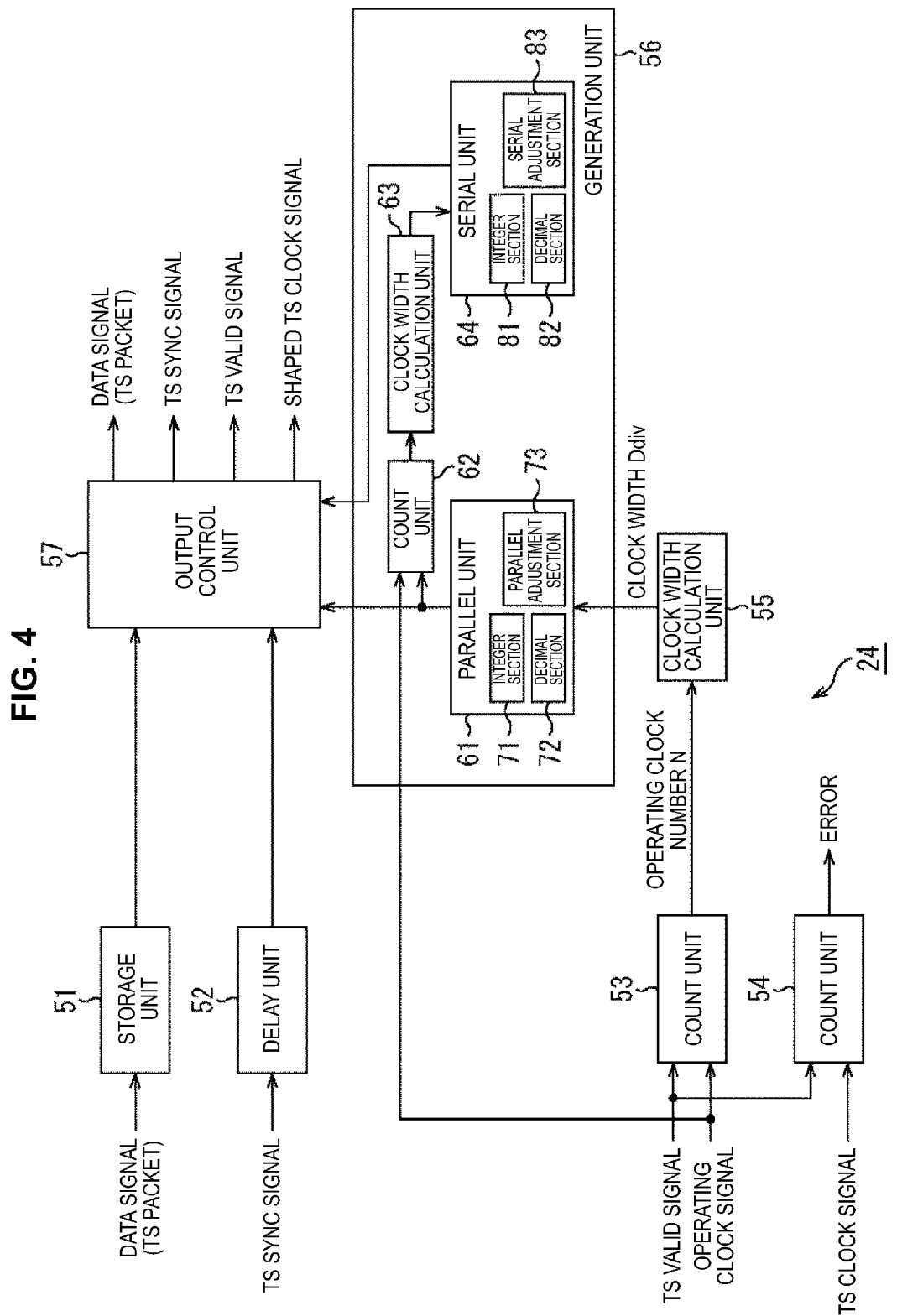
FIG. 4 is a block diagram illustrating an exemplary configuration of a smoothing unit.

FIG. 4 is a block diagram illustrating an exemplary configuration of the smoothing unit 24 of FIG. 1.

Referring to FIG. 4, the smoothing unit 24 includes a storage unit 51, a delay unit 52, counting units 53 and 54, a clock width calculation unit 55, a generation unit 56, and an output control unit 57.

A data signal (TS) included in the output signals that is from the selector 23 is supplied to the storage unit 51.

The storage unit 51 temporarily stores the data signal (TS) that is from the selector 23.

A TS sync signal included in the output signals that are from the selector 23 is supplied to the delay unit 52.

The delay unit 52 delays the TS sync signal that is from the selector 23 and supplies the delayed TS sync signal to the output control unit 57.

In other words, the delay unit 52 delays a pulse indicating the head of a TS packet serving as a TS sync signal that is from the selector 23 by a certain amount of time, that is, until the timing of the head of the next TS packet, and supplies the delayed TS sync signal to the output control unit 57.

The counting unit 53 is provided with a TS valid signal included in the output signals that are from the selector 23 as well as the operating clock signal generated in the clock generation unit 26.

The counting unit 53 detects the valid section in the data signal (TS) in which the TS packet exists from the TS valid signal that is from the selector 23 and counts a clock number (the number of rising edges or the number of falling edges) (hereinafter, also referred to as a valid operating clock number) N of the operating clock signal in the valid section generated in the clock generation unit 27.

Moreover, the counting unit 53 supplies the valid operating clock number N to the clock width calculation unit 55.

The TS valid signal and the TS clock signals that are included in the output signals that are from the selector 23 are supplied to the counting unit 54.

The counting unit 54 detects the valid section from the TS valid signal that is from the selector 23 and counts the clock number (hereinafter, also referred to as a valid TS clock number) of the TS clock signal, which is from the selector 23, in the valid section.

Moreover, when the valid TS clock number (the count value of the number of clocks in the TS clock signal in the valid section) is below 188 bytes, which is the data length of the TS packet, the counting unit 54 outputs an error message implying that there is an abnormality in the data length of the TS packet.

The clock width calculation unit 55 calculates a clock width Ddiv that corresponds to the data rate of the valid section of the TS by using the valid operating clock number N that is from the counting unit 53.

In other words, the clock width calculation unit 55 divides the valid operating clock number N from the count unit 53 by (188×2) bytes that is a half period of the data length of the TS packet to obtain a value (hereinafter, also referred to as a byte clock number) N/(188×2) as the clock width Ddiv.

Now, since the byte clock number N/(188×2) is a reciprocal of the half period of the data rate of the TS packet and corresponds to the data rate of the TS packet, it can be said that the clock width Ddiv that is expressed by the byte clock number N/(188×2) corresponds to the data rate of (the valid sections of) the TS packet.

Note that the unit of Ddiv that indicates the clock width is the clock number of the operating clock signal generated in the clock generation unit 26 (hereinafter, also referred to as merely an operating clock signal). Accordingly, by multiplying Ddiv by the amount of time that is a period of the operating clock signal, a clock width based on a unit of time can be obtained.

Furthermore, in the clock width calculation unit 55, (a clock number that corresponds to) the amount of time that is greater than or equal to the minimum clock width Tclkp of the AC spec is calculated as the clock width Ddiv.

The clock width calculation unit 55 supplies the clock width Ddiv to the generation unit 56.

The generation unit 56 generates a pulse-like clock signal whose period is the clock width Ddiv that has been calculated in the clock width calculation unit 44 and outputs the pulse-like clock signal to the output control unit 57 as a shaped TS clock signal that is a TS clock signal of the TS packet to which shaping has been performed.

The output control unit 57 synchronizes with the shaped TS clock signal from the generation unit 56 and performs an output control that outputs the data signals (TS) stored in the storage unit 51 and the TS sync signals that have been delayed in the delay unit 52 to the processing module 25.

Furthermore, the output control unit 57 performs an output control that generates, from the rising edge of the TS sync signal, a TS valid signal in which the section amounting to 188 clocks of the shaped TS clock signal is level H and outputs the TS valid signal to the processing module 25.

Note that, when the counting unit 54 outputs an error message implying that there is an abnormality in the data length of the TS packet, the output control unit 57 discards (deletes) the TS packet having an abnormality in the data length that is included in the data signal stored in the storage unit 51 without outputting the abnormal TS packet.

Furthermore, the generation unit 56 includes a parallel unit 61 that generates a parallel clock signal among the shaped TS clock signal, a count unit 62, a clock width calculation unit 63 and a serial unit 64 that generates a serial clock signal among the shaped TS clock signal.

The parallel unit 61 includes an integer section 71, a decimal section 72, and a parallel adjustment section 73. The integer section 71 calculates and stores an integer section Dint of the clock width Ddiv. The decimal section 72 calculates and stores a decimal section Drem of the clock width Ddiv. On the basis of the integer section Dint of the clock width Ddiv, the parallel adjustment section 73 sets the reference lengths of the level H section and the level L section of the parallel clock signal that are based on the TS clock signal, and on the basis of the decimal section Drem of the clock width Ddiv, adjusts the reference lengths of the level H section and the level L section that are set with the integer section Dint by adding a minimum section of the TS clock signal, so as to generate a shaped parallel clock signal.

The count unit 62 counts the clock number M of the operating clock signal of the parallel clock in the level H section or the level L section, and supplies the clock number M to the clock width calculation unit 63.

The clock width calculation unit 63, using the clock number M from the count unit 62, calculates a clock width Mdiv of the parallel clock signal corresponding to the data rate of the valid section of the TS.

The serial unit 64 includes an integer section 81, a remainder section 82, and a serial adjustment section 83. On the bases of the clock width Mdiv of the parallel clock signal generated by the clock width calculation unit 63, the integer section 81 calculates the quotient, obtained when dividing the clock width Mdiv by a predetermined integer, as an integer section Mint. The remainder section 82 calculates a remainder Mrem obtained when dividing the clock width Mdiv by the predetermined integer. On the basis of the integer section Mint of the clock width Mdiv, the parallel adjustment section 83 sets the reference lengths of the level H section and the level L section of the serial clock signal that are based on the TS clock signal, and on the basis of the remainder Mrem of the clock width Mdiv, adjusts the reference lengths of the level H section and the level L section that are set with the integer section Mint by adding a minimum section of the TS clock signal, so as to generate a shaped serial clock signal.

<Smoothing Processing of TS Clock Signal>

Figure 5:
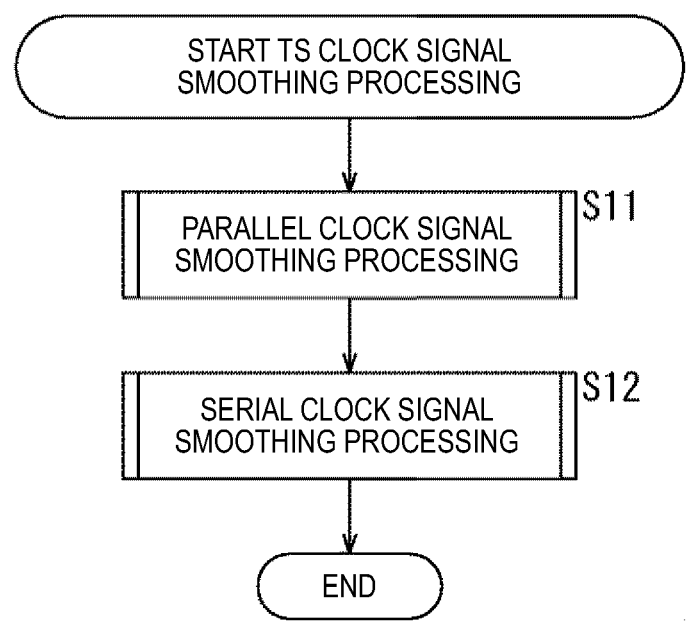
FIG. 5 is a flowchart for describing a TS clock signal smoothing processing.

Referring to the flowchart in FIG. 5, TS clock signal smoothing processing with the smoothing unit 24 will be described next.

In step S11, the parallel unit 61 executes parallel clock signal smoothing processing to shape and output a parallel clock signal.

In step S12, a parallel unit 62 executes serial clock signal smoothing processing to shape and output a serial clock signal.

With the above processing, the parallel clock signal and the serial clock signal that are TS clock signals are shaped and output. Note that the details of the parallel clock signal smoothing processing and the serial clock signal smoothing processing will be described with reference to the flowcharts in FIG. 6 and FIG. 8, respectively.

<Parallel Clock Signal Smoothing Processing>

Figure 6:
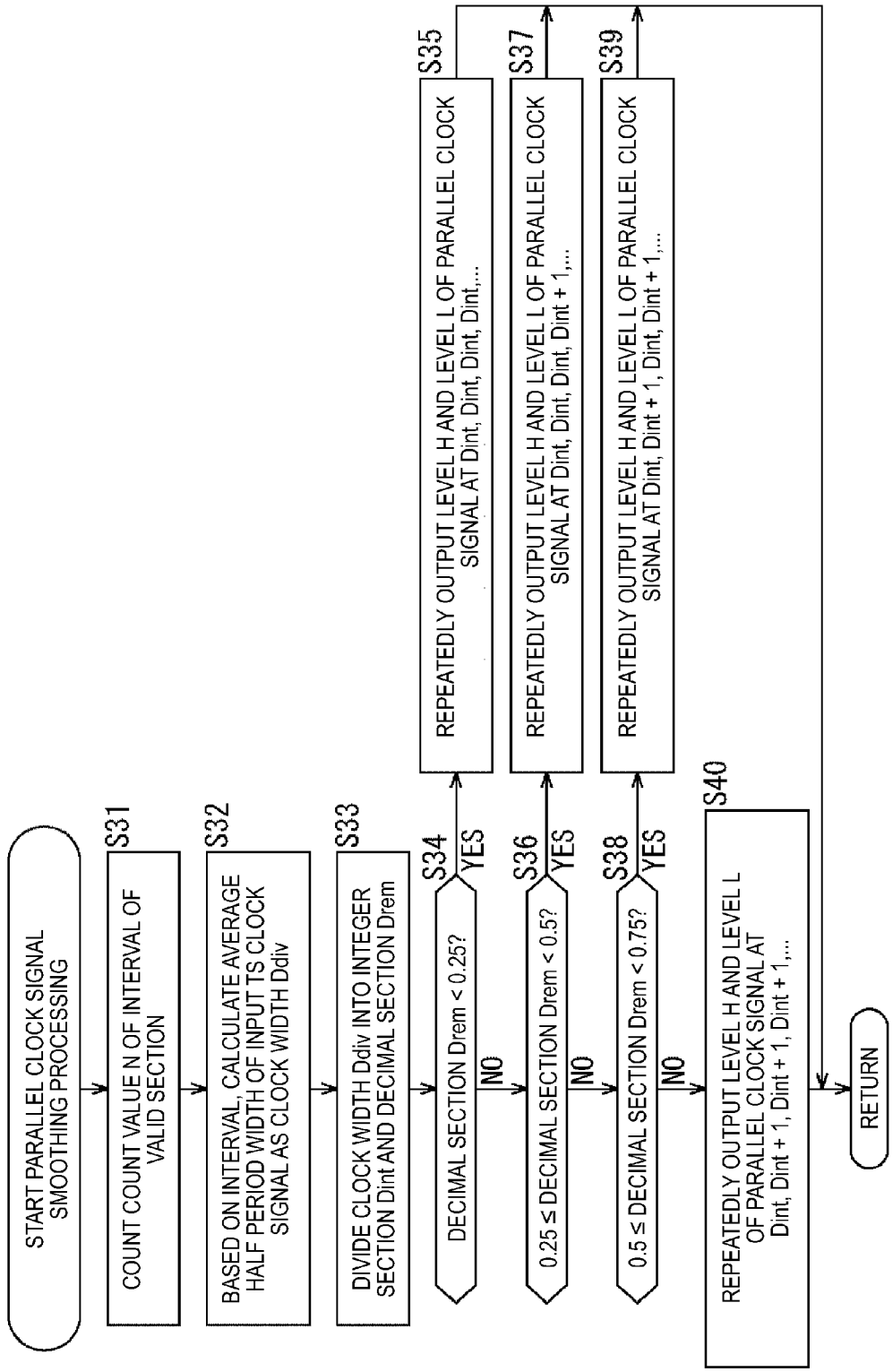
FIG. 6 is a flowchart for describing a parallel clock signal smoothing processing.

With reference to the flowchart in FIG. 6, the parallel clock signal smoothing processing will be described next. Note that hereinafter, cases in which the average frequency of the parallel clock is smoothed to 12.0 MHz, 11.6 MHz, 11.3 MHz, 11.0 MHz, 10.7 MHz, and 10.4 MHz while the operating clock is 192 MHz and the data length of the TS packet is 188 bytes will be described; however, smoothing to other average frequencies can be performed with a similar method.

In step S31, the count unit 53 counts the valid operating clock number N and supplies the counted valid operating clock number N to the clock width calculation unit 55. In other words, the count unit 53 counts the operating clock number in the valid section in which the TS signal is indicated at level H, as described while referring to FIG. 2.

In step S32, the clock width calculation unit 55 calculates the half period width Ddiv of the TS clock on the basis of the valid operating clock number N supplied from the count unit 53. More specifically, the clock width calculation unit 55 obtains the byte clock number N/188, which is a value divided by 188 bytes that is the data length of the TS packet, as the period width of the TS clock and, further, obtains half of the byte clock number N/188 as the half period width N/(188×2) of the TS clock. Furthermore, the clock width calculation unit 55 calculates, as the clock width Ddiv, a value in which the figures of the half period width N/(188×2) of the TS clock below the second place of decimals are omitted.

In step S33, the parallel unit 61 divides the clock width Ddiv into the integer section Dint and the decimal section Drem. In other words, in the parallel unit 61, the integer section 71 calculates and stores the integer section Dint of the clock width Ddiv. In a similar manner, in the parallel unit 61, the decimal section 72 calculates and stores the decimal section Drem of the clock width Ddiv. As a result, the clock width Ddiv is divided into the integer section Dint and the decimal section Drem and is stored in the integer section 71 and the decimal section 72.

In step S34, the parallel adjustment section 73 determines whether the decimal section Drem is smaller than 0.25. In step S34, when the decimal section Drem is determined to be smaller than 0.25, for example, the process proceeds to step S35.

In step S35, the parallel adjustment section 73 changes and outputs the level L and level H sections of the parallel clock signal so that the sections are repeated at an interval with a length of Dint, Dint, Dint, Dint, and the process is ended. In other words, as illustrated in the parallel clock signal in the uppermost right portion in FIG. 7, the level L and level H sections are repeated and output at an interval with a length Dint, Dint, Dint, Dint. In such a case, as illustrated in the left portion in FIG. 7, the parallel clock signal is output at 12 MHz, for example. In other words, in the case of 12 MHz, since the operating clock is 192 MHz, a clock signal in which the level H and the level L alternately change every eight divisions of the operating clock, in other words, at an interval of eight counts of the operating clock, is output. Furthermore, as illustrated in the left portion in FIG. 7, the parallel clock signal is output at 10.7 MHz, for example. In other words, in the case of 10.7 MHz, since the operating clock is 192 MHz, a clock signal in which the level H and the level L alternately change every nine divisions of the operating clock, in other words, at an interval of nine counts of the operating clock is output.

Figure 7:
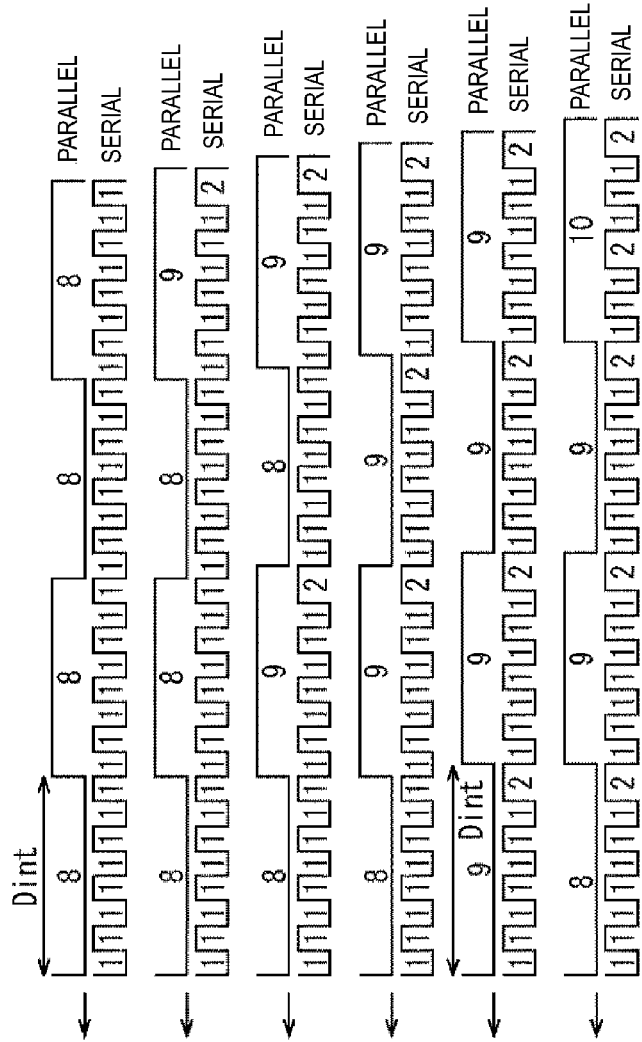
FIG. 7 is a diagram for describing a TS clock signal smoothing processing.

Note that in the left portion in FIG. 7, the average frequency (MHz) is written in the left column, the frequency of the serial clock signal is written in the upper row, and the frequency of the parallel clock signal is written in the lower row, while each of the frequencies correspond to each other. Furthermore, in the middle column in the left portion of FIG. 7 in the column in which parallel is written, circle marks are entered for the frequencies that can be expressed as a parallel clock signal in a case in which the present technique is applied and in a case in which a conventional technique is applied. Furthermore, in the right column in the left portion of FIG. 7 in the column in which serial is written, circle marks are entered for the frequencies that can be expressed as a serial clock signal in a case in which the present technique is applied and in a case in which conventional technique is applied.

On the other hand, in step S34, when the decimal section Drem is determined not to be smaller than 0.25, for example, the process proceeds to step S36.

In step S36, the parallel adjustment section 73 determines whether the decimal section Drem is larger than 0.25 and is smaller than 0.5. In step S36, when the decimal section Drem is determined to be larger than 0.25 and smaller than 0.5, for example, the process proceeds to step S37.

In step S37, the parallel adjustment section 73 changes and outputs the level L and level H sections of the parallel clock signal so that the sections are repeated at an interval with a length of Dint, Dint, Dint, Dint+1, and the process is ended. In other words, as illustrated in the parallel clock signal in the second row from the right upper portion in FIG. 7, the level L and level H sections are repeated and output at an interval with a length Dint, Dint, Dint, Dint+1. In such a case, as illustrated in the left portion of FIG. 7, for example, a parallel clock signal of 11.6 MHz is output. In other words, in the case of 11.6 MHz, since the operating clock is 192 MHz, a clock signal in which the level H and the level L alternately change so that the ratio between eight divisions of the operating clock, that is, an interval of eight counts of the operating clock, and nine divisions of the operating clock, that is, an interval of nine counts of the operating clock is 3:1 is output. Note that in FIG. 7, an example is illustrated in which the interval of the operating clock changes in the order of Dint, Dint, Dint, Dint+1; however, it is only sufficient that the average frequency of the clock signal is set and, as long as the ratio is similar, the order of the interval of the different clock count may be different. Accordingly, the interval of the different clock count may be, for example, in the order of Dint+1, Dint, Dint, Dint, in the order of Dint, Dint+1, Dint, Dint, or in the order of Dint, Dint, Dint+1, Dint.

Furthermore, as illustrated in the left portion of FIG. 7, a parallel clock signal of 10.4 MHz is output, for example. In other words, in the case of 10.4 MHz, since the operating clock is 192 MHz, a clock signal in which the level H and the level L alternately change so that the ratio between nine divisions of the operating clock, that is, an interval of nine counts of the operating clock, and ten divisions of the operating clock, that is, an interval of ten counts of the operating clock is 3:1 is output. In the above case as well, in a similar manner, as long as the ratio is similar, the order of the interval of the different clock count may be different.

Furthermore, in step S36, when the decimal section Drem is determined to be not larger than 0.25 or not smaller than 0.5, for example, the process proceeds to step S38.

In step S38, the parallel adjustment section 73 determines whether the decimal section Drem is larger than 0.5 and is smaller than 0.75. In step S38, when the decimal section Drem is determined to be larger than 0.5 and smaller than 0.75, for example, the process proceeds to step S39.

In step S39, the parallel adjustment section 73 changes and outputs the level L and level H sections of the parallel clock signal so that the sections are repeated at an interval with a length of Dint, Dint+1, Dint, Dint+1, and the process is ended. In other words, as illustrated in the parallel clock signal in the third row from the right upper portion in FIG. 7, the level L and level H sections are repeated and output at an interval with a length Dint, Dint+1, Dint, Dint+1. In such a case, as illustrated in the left portion of FIG. 7, for example, a parallel clock signal of 11.3 MHz is output. In other words, in the case of 11.3 MHz, since the operating clock is 192 MHz, a clock signal in which the level H and the level L alternately change so that the ratio between eight divisions of the operating clock, that is, an interval of eight counts of the operating clock, and nine divisions of the operating clock, that is, an interval of nine counts of the operating clock is 1:1 is output. Note that in FIG. 7, an example is illustrated in which the interval of the operating clock changes in the order of Dint, Dint+1, Dint, Dint+1; however, it is only sufficient that the average frequency of the clock signal is set and, as long as the ratio is similar, the order of the interval of the different clock count may be different. Accordingly, the interval of the different clock count may be, for example, in the order of Dint+1, Dint, Dint, Dint+1, in the order of Dint, Dint, Dint+1, Dint+1, in the order of Dint+1, Dint, Dint+1, Dint, in the order of Dint+1, Dint+1, Dint, Dint, or in the order of Dint+1, Dint+1, Dint+1, Dint.

Furthermore, in step S38, when the decimal section Drem is determined to be not larger than 0.5 or not smaller than 0.75, that is, when the decimal section Drem is assumed to be larger than 0.75, for example, the process proceeds to step S38.

In step S40, the parallel adjustment section 73 changes and outputs the level L and level H sections of the parallel clock signal so that the sections are repeated at an interval with a length of Dint, Dint+1, Dint+1, Dint+1. In other words, as illustrated in the parallel clock signal in the fourth row from the right upper portion in FIG. 7, the level L and level H sections are repeated and output at an interval with a length Dint, Dint+1, Dint+1, Dint+1. In such a case, as illustrated in the left portion of FIG. 7, for example, a parallel clock signal of 11.0 MHz is output. In other words, in the case of 11.0 MHz, since the operating clock is 192 MHz, a clock signal in which the level H and the level L alternately change so that the ratio between eight divisions of the operating clock, that is, an interval of eight counts of the operating clock, and nine divisions of the operating clock, that is, an interval of nine counts of the operating clock is 1:3 is output. Note that in FIG. 7, an example is illustrated in which the interval of the operating clock changes in the order of Dint, Dint+1, Dint+1, Dint+1; however, it is only sufficient that the average frequency of the clock signal is set and, as long as the ratio is similar, the order of the interval of the different clock count may be different. Accordingly, the interval of the different clock count may be, for example, in the order of Dint+1, Dint, Dint+1, Dint+1, in the order of Dint+1, Dint+1, Dint, Dint+1, or in the order of Dint+1, Dint+1, Dint+1, Dint.

With the above process, by combining the clocks with different frequency dividing rates in the operating clock, parallel clock signals with various frequencies in accordance with the TS data rate can be generated. Note that the example of the generated frequency of the parallel clock signal described above is only an example, and by combining clock signals with various frequency dividing rates, parallel clock signals with frequencies that are different from those described above can be generated.

<Serial Clock Signal Smoothing Processing>

Figure 8:
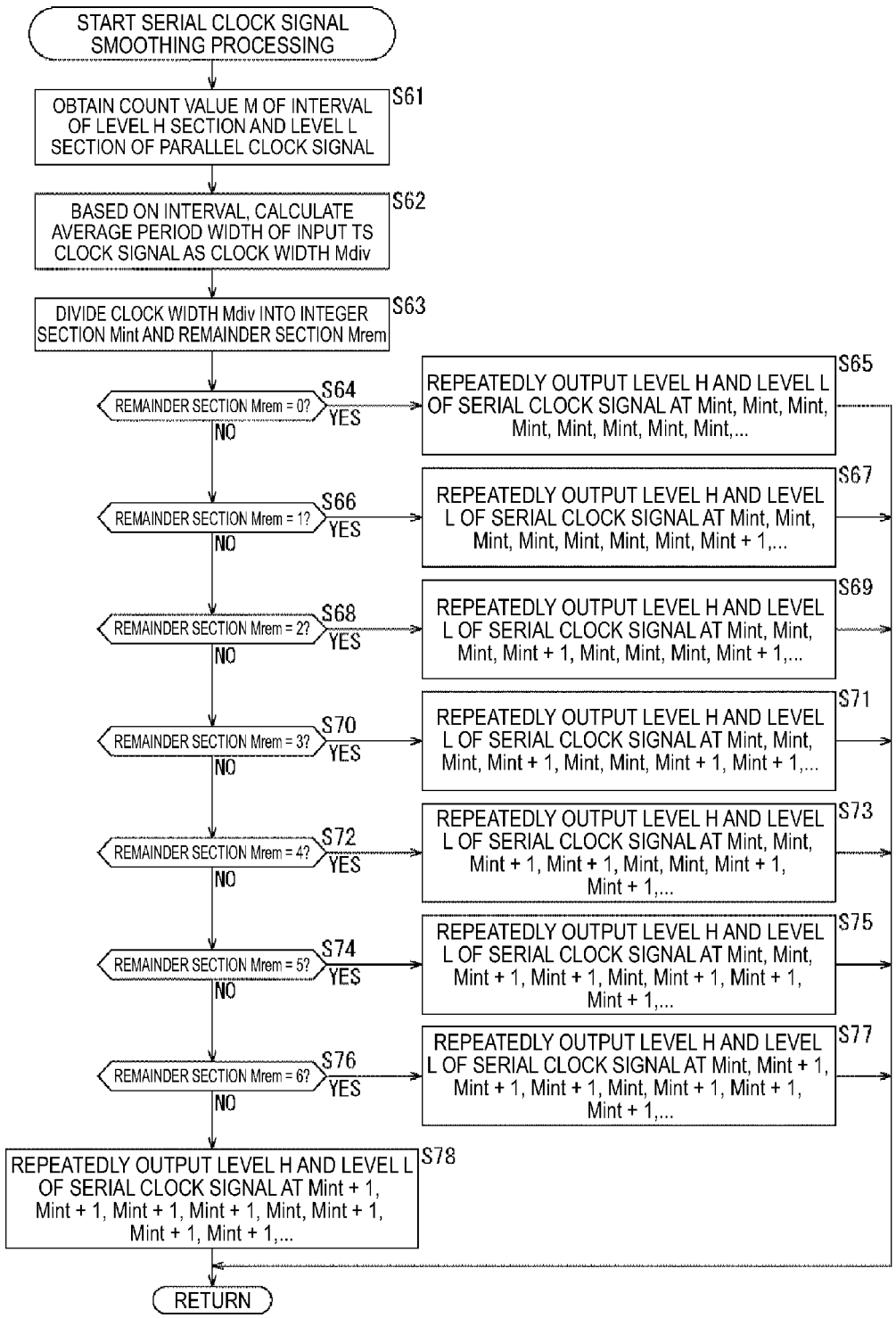
FIG. 8 is a flowchart for describing a serial clock signal smoothing processing.

With reference to the flowchart in FIG. 8, the serial clock signal smoothing processing will be described next. Note that hereinafter, cases in which the average frequency of the serial clock is smoothed to 96.0 MHz, 93.1 MHz, 90.4 MHz, 87.8 MHz, 85.3 MHz, and 83.0 MHz while the operating clock is 192 MHz and the data length of the TS packet is 188 bytes will be described; however, smoothing to other average frequencies can be performed with a similar method. Furthermore, since the serial clock signal smoothing processing is a process that uses the parallel clock signal that has been obtained in the preceding parallel clock signal smoothing processing, the serial clock signal smoothing processing is performed on the premise that the parallel clock signal smoothing processing has been executed before the serial clock signal smoothing processing.

In other words, in step S61, the count unit 62 counts the clock number M in the level H and level L sections and supplies the clock number M to the clock width calculation unit 55. In other words, the count unit 62 counts the operating clock number M in the section in which the parallel clock signal is indicated at level H or level L, as described while referring to FIG. 7.

In step S62, the clock width calculation unit 63 divides the parallel clock number M that has been supplied from the count unit 62 by 8 and calculates the resultant clock width Mint and remainder section Mrem.

In step S63, in the serial unit 64, the clock width Mint is stored in the integer section 81. In a similar manner, in the serial unit 64, the remainder section Mrem is stored in the remainder section 82.

In step S64, the serial adjustment section 83 determines whether the remainder section Mrem is 0. In step S64, for example, when the remainder section Mrem is determined to be 0, for example, the process proceeds to step S65.

In step S65, the serial adjustment section 83 changes and outputs the level L and level H sections of the serial clock signal so that the sections are repeated at an interval with a length of Mint, Mint, Mint, Mint, Mint, Mint, Mint, Mint, and the process is ended. In other words, as illustrated in the serial clock signal in the uppermost right portion in FIG. 7, the level L and level H sections are repeated and output at an interval with a length Mint, Mint, Mint, Mint, Mint, Mint, Mint, Mint. In such a case, as illustrated in the left portion in FIG. 7, the serial clock signal is output at 96 MHz (corresponding to 12 MHz of the parallel clock signal). In other words, in the case of 96 MHz, since the operating clock is 192 MHz, a clock signal in which the level H and the level L alternately change at an interval of 1 count of the operating clock is output.

On the other hand, in step S64, when the remainder section Mrem is determined not to be 0, for example, the process proceeds to step S66.

In step S66, the serial adjustment section 83 determines whether the remainder section Mrem is 1. In step S66, for example, when the remainder section Mrem is determined to be 1, for example, the process proceeds to step S67.

In step S67, the serial adjustment section 83 changes and outputs the level L and level H sections of the parallel clock signal so that the sections are repeated at an interval with a length of Mint, Mint, Mint, Mint, Mint, Mint, Mint, Mint+1, and the process is ended. In other words, the level L and level H sections in the parallel clock signal with nine frequency dividing rates in the second row from the right upper portion in FIG. 7 are repeated and output at an interval with a length Mint, Mint, Mint, Mint, Mint, Mint, Mint, Mint+1. In the above case, as illustrated in the left portion in FIG. 7, for example, by repeatedly setting the level L and level H sections of the serial clock signal in the section indicated as Dint+1 in the Dint, Dint, Dint, Dint+1 of the parallel clock signal at an interval with a length of Mint, Mint, Mint, Mint, Mint, Mint, Mint, Mint+1, a serial clock signal of 93.1 MHz (corresponding to 11.6 MHz of the parallel clock signal) is output.

In other words, an example is illustrated in which a serial clock signal of 93.1 MHz (corresponding to 11.6 MHz of the parallel clock signal) is output in the case of 93.1 MHz by alternately changing the level H and the level L so that, in the parallel clock signal, the ratio between eight divisions of the operating clock, that is, an interval of eight counts of the operating clock, and nine divisions of the operating clock, that is, an interval of nine counts of the operating clock is 7:1 and by repeatedly setting the level L and level H sections of the serial clock signal in every nine divisions of the operating clock, that is, in an interval of nine counts of the operating clock, to be repeated at an interval with a length of Mint, Mint, Mint, Mint, Mint, Mint, Mint, Mint+1. In other words, in the interval of nine counts of the operating clock, the level L and level H of the serial clock signal are changed so that the ratio between a single division in the level L and level H sections of the serial clock signal, that is, an interval of a single count of the operating clock and two divisions, that is, an interval of two counts of the operating clock is 7:1.

Note that it is only sufficient that the average frequency of the serial clock signal is set; accordingly, as long as the ratio is similar, that is 7:1, the order of the interval of the different clock count may be different. Accordingly, the interval of the different clock count may be, for example, in the order of Mint, Mint+1, Mint, Mint, Mint, Mint, Mint, Mint, in the order of Mint, Mint, Mint+1, Mint, Mint, Mint, Mint, Mint, in the order of Mint, Mint, Mint, Mint+1, Mint, Mint, Mint, Mint, in the order of Mint, Mint, Mint, Mint, Mint+1, Mint, Mint, Mint, in the order of Mint, Mint, Mint, Mint, Mint, Mint+1, Mint, Mint, in the order of Mint, Mint, Mint, Mint, Mint, Mint, Mint+1, Mint, or in the order of Mint, Mint, Mint, Mint, Mint, Mint, Mint, Mint+1.

In step S66, when the remainder section Mrem is determined not to be 1, for example, the process proceeds to step S68.

In step S68, the serial adjustment section 83 determines whether the remainder section Mrem is 2. In step S68, for example, when the remainder section Mrem is determined to be 2, for example, the process proceeds to step S69.

In step S69, the serial adjustment section 83 changes and outputs the level L and level H sections of the parallel clock signal so that the sections are repeated at an interval with a length of Mint, Mint, Mint, Mint+1, Mint, Mint, Mint, Mint+1, and the process is ended. In other words, the level L and level H sections in the parallel clock signal with ten frequency dividing rates in the third row from the right upper portion in FIG. 7 are repeated and output at an interval with a length Mint, Mint, Mint, Mint+1, Mint, Mint, Mint, Mint+1. In the above case, as illustrated in the left portion in FIG. 7, for example, by repeatedly setting the level L and level H sections of the serial clock signal in the section indicated as Dint+1 in the Dint, Dint, Dint, Dint+1 of the parallel clock signal at an interval with a length of Mint, Mint, Mint, Mint, Mint, Mint, Mint, Mint+1, a serial clock signal of 83.0 MHz (corresponding to 20.8 MHz of the parallel clock signal) is output.

In other words, an example is illustrated in which a serial clock signal of 83.0 MHz (corresponding to 20.8 MHz of the parallel clock signal) is output in the case of 20.8 MHz by alternately changing the level H and the level L so that, in the parallel clock signal, the ratio between nine divisions of the operating clock, that is, an interval of nine counts of the operating clock, and ten divisions of the operating clock, that is, an interval of ten counts of the operating clock is 6:2 and by repeatedly setting the level L and level H sections of the serial clock signal in every ten divisions of the operating clock, that is, in an interval of ten counts of the operating clock, to be repeated at an interval with a length of Mint, Mint, Mint, Mint+1, Mint, Mint, Mint, Mint+1. In other words, in the interval of ten counts of the operating clock, the level L and level H of the serial clock signal are changed so that the ratio between a single division in the level L and level H sections of the serial clock signal, that is, an interval of a single count of the operating clock and two divisions, that is, an interval of two counts of the operating clock is 6:2.

Note that it is only sufficient that the average frequency of the serial clock signal is set; accordingly, as long as the ratio is similar, that is 6:2, the order of the interval of the different clock count may be different. Accordingly, the interval of the different clock count may be, for example, in the order of Mint+1, Mint+1, Mint, Mint, Mint, Mint, Mint, Mint, in the order of Mint+1, Mint, Mint+1, Mint, Mint, Mint, Mint, Mint, in the order of Mint+1, Mint, Mint, Mint+1, Mint, Mint, Mint, Mint, Mint, in the order of Mint+1, Mint, Mint, Mint, Mint+1, Mint, Mint, Mint, in the order of Mint+1, Mint, Mint, Mint, Mint, Mint+1, Mint, Mint, in the order of Mint+1, Mint, Mint, Mint, Mint, Mint, Mint+1, Mint, in the order of Mint+1, Mint, Mint, Mint, Mint, Mint, Mint, Mint+1 or the like.

Furthermore, in step S68, when the remainder section Mrem is determined not to be 2, for example, the process proceeds to step S70.

In step S70, the serial adjustment section 83 determines whether the remainder section Mrem is 3. In step S70, for example, when the remainder section Mrem is determined to be 3, for example, the process proceeds to step S71.

In step S71, the serial adjustment section 83 changes and outputs the level L and level H sections of the parallel clock signal so that the sections are repeated at an interval with a length of Mint, Mint, Mint, Mint+1, Mint, Mint, Mint+1, Mint+1, and the process is ended. In other words, in the interval of eleven counts of the operating clock in the parallel clock signal, the level L and level H of the serial clock signal are changed so that the ratio between a single division in the level L and level H sections of the serial clock signal, that is, an interval of a single count of the operating clock and two divisions, that is, an interval of two counts of the operating clock is 5:3.

Note that it is only sufficient that the average frequency of the serial clock signal is set; accordingly, as long as the ratio of the interval of a single count of the operating clock and the interval of two counts of the operating clock is similar, that is, 5:3, the order of the interval of the different clock count may be different.

In step S70, when the remainder section Mrem is determined not to be 3, for example, the process proceeds to step S72.

In step S72, the serial adjustment section 83 determines whether the remainder section Mrem is 4. In step S72, for example, when the remainder section Mrem is determined to be 4, for example, the process proceeds to step S73.

In step S73, the serial adjustment section 83 changes and outputs the level L and level H sections of the parallel clock signal so that the sections are repeated at an interval with a length of Mint, Mint, Mint+1, Mint+1, Mint, Mint, Mint+1, Mint+1, and the process is ended. In other words, in the interval of twelve counts of the operating clock in the parallel clock signal, the level L and level H of the serial clock signal are changed so that the ratio between a single division in the level L and level H sections of the serial clock signal, that is, an interval of a single count of the operating clock and two divisions, that is, an interval of two counts of the operating clock is 4:4.

Note that it is only sufficient that the average frequency of the serial clock signal is set; accordingly, as long as the ratio of the interval of a single count of the operating clock and the interval of two counts of the operating clock is similar, that is, 4:4, the order of the interval of the different clock count may be different.

Furthermore, in step S72, when the remainder section Mrem is determined not to be 4, for example, the process proceeds to step S74.

In step S74, the serial adjustment section 83 determines whether the remainder section Mrem is 5. In step S74, for example, when the remainder section Mrem is determined to be 5, for example, the process proceeds to step S75.

In step S75, the serial adjustment section 83 changes and outputs the level L and level H sections of the parallel clock signal so that the sections are repeated at an interval with a length of Mint, Mint, Mint+1, Mint+1, Mint, Mint+1, Mint+1, Mint+1, and the process is ended. In other words, in the interval of thirteen counts of the operating clock in the parallel clock signal, the level L and level H of the serial clock signal are changed so that the ratio between a single division in the level L and level H sections of the serial clock signal, that is, an interval of a single count of the operating clock and two divisions, that is, an interval of two counts of the operating clock is 3:5.

Note that it is only sufficient that the average frequency of the serial clock signal is set; accordingly, as long as the ratio of the interval of a single count of the operating clock and the interval of two counts of the operating clock is similar, that is, 3:5, the order of the interval of the different clock count may be different.

In step S74, when the remainder section Mrem is determined not to be 5, for example, the process proceeds to step S76.

In step S76, the serial adjustment section 83 determines whether the remainder section Mrem is 6. In step S76, for example, when the remainder section Mrem is determined to be 6, for example, the process proceeds to step S77.

In step S77, the serial adjustment section 83 changes and outputs the level L and level H sections of the parallel clock signal so that the sections are repeated at an interval with a length of Mint, Mint+1, Mint+1, Mint+1, Mint, Mint+1, Mint+1, Mint+1, and the process is ended. In other words, in the interval of fourteen counts of the operating clock in the parallel clock signal, the level L and level H of the serial clock signal are changed so that the ratio between a single division in the level L and level H sections of the serial clock signal, that is, an interval of a single count of the operating clock and two divisions, that is, an interval of two counts of the operating clock is 2:6.

Note that it is only sufficient that the average frequency of the serial clock signal is set; accordingly, as long as the ratio of the interval of a single count of the operating clock and the interval of two counts of the operating clock is similar, that is, 2:6, the order of the interval of the different clock count may be different.

Furthermore, in step S76, when the remainder section Mrem is determined not to be 6, for example, the remainder section Mrem is assumed to be 7, and the process proceeds to step S78.

In step S78, the serial adjustment section 83 changes and outputs the level L and level H sections of the parallel clock signal so that the sections are repeated at an interval with a length of Mint+1, Mint+1, Mint+1, Mint+1, Mint, Mint+1, Mint+1, Mint+1, and the process is ended. In other words, in the interval of fifteen counts of the operating clock in the parallel clock signal, the level L and level H of the serial clock signal are changed so that the ratio between a single division in the level L and level H sections of the serial clock signal, that is, an interval of a single count of the operating clock and two divisions, that is, an interval of two counts of the operating clock is 1:7.

Note that it is only sufficient that the average frequency of the serial clock signal is set; accordingly, as long as the ratio of the interval of a single count of the operating clock and the interval of two counts of the operating clock is similar, that is, 1:7, the order of the interval of the different clock count may be different.

With the above process, by combining the clocks with different frequency dividing rates in the operating clock, serial clock signals with various frequencies in accordance with the TS data rate can be generated. Note that the example of the generated frequency of the serial clock signal described above is only an example, and by combining clock signals with various frequency dividing rates, parallel clock signals with frequencies that are different from those described above can be generated.

Figure 9:
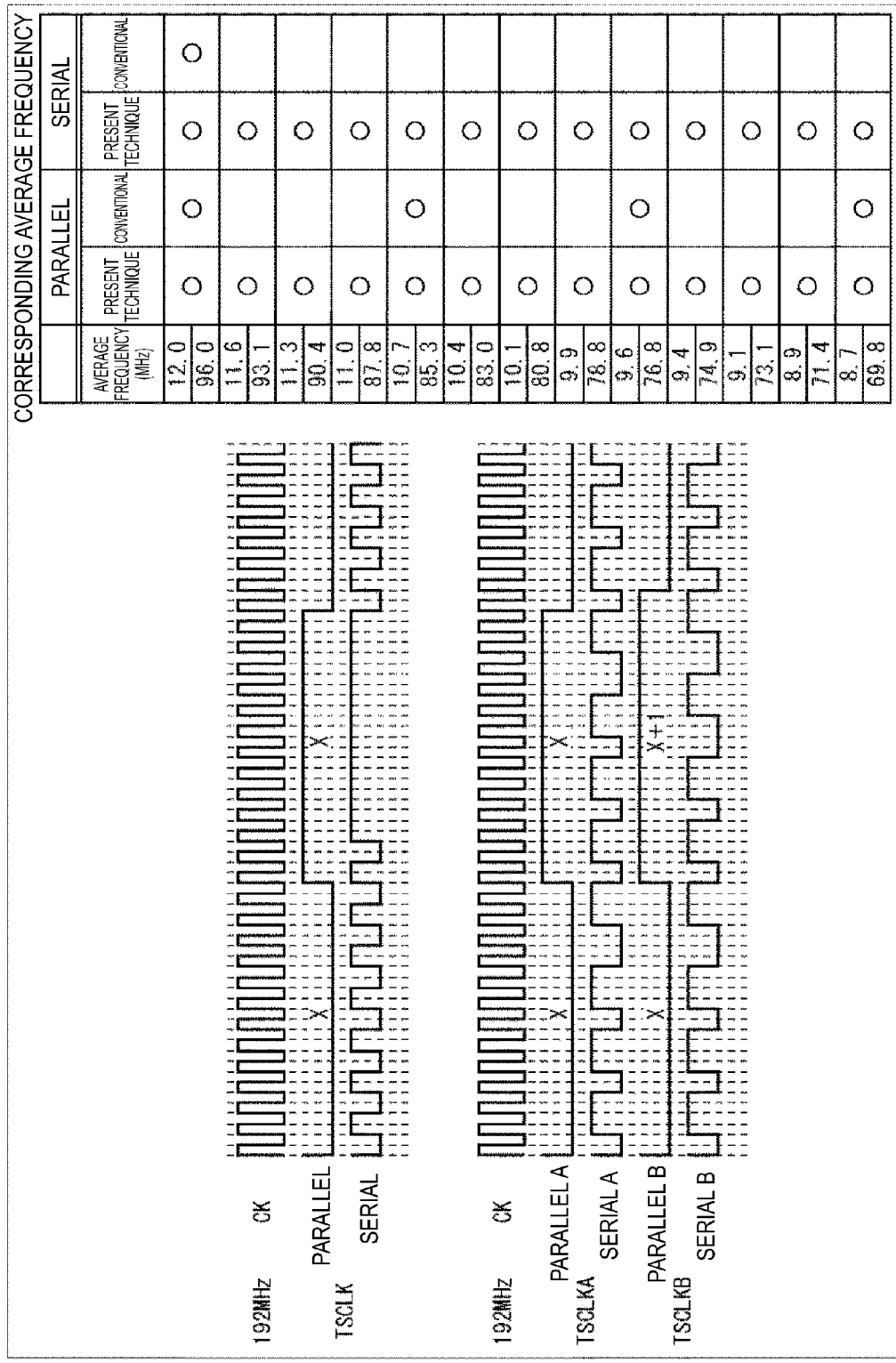
FIG. 9 is a diagram for describing a TS clock signal smoothing processing.

In other words, as illustrated in the upper left portion in FIG. 9, conventionally, the ratio of the level H and the level L of the parallel clock signal can only be set at 50% of the count value of the operating clock.

However, as illustrated in the lower left portion in FIG. 9, with the present technique described above, in the count value of the operating clock, the ratio of the level H to the level L of the parallel clock signal can, as a matter of course, in a similar manner to the related art, be set to x:x as illustrated in pattern A of the parallel clock signal and can be set to x:x+1 as illustrated in pattern B of the parallel clock signal. Accordingly, by combining clock signals with different count values, clock signals with various average frequencies can be set. Furthermore, by combining the pattern A of the parallel clock signal and the pattern B of the parallel clock signal illustrated in the lower left portion in FIG. 9, a different parallel clock signal can be further set.

Furthermore, as illustrated in the upper left portion in FIG. 9, only fixed patterns can be used for the level H and the level L of the serial clock signal.

However, with the present technique described above, as illustrated in the lower left portion in FIG. 9, various patterns of the level H and the level L of the serial clock signal can be set.

As a result, while, hitherto, only 96 MHz or the like can be set as the serial clock signal, as illustrated in the right portion in FIG. 9, frequencies such as 96 MHz, 93.1 MHz, 90.4 MHz, 87.8 MHz, 85.3 MHz, 83 MHz, 80.8 MHz, 78.8 MHz, 76.8 MHz, 74.9 MHz, 73.1 MHz, 71.4 MHz, and 69.8 MHz can be set with the application of the present technique. Furthermore, in a similar manner, in the parallel clock as well, while only 12.0 MHz, 10.7 MHz, 9.6 MHz, 8.7 MHz and the like can be set hitherto, as illustrated in the right portion in FIG. 9, frequencies that could not be set hitherto, such as 12.0 MHz, 11.6 MHz, 11.3 MHz, 11.0 MHz, 10.7 MHz, 10.4 MHz, 10.1 MHz, 9.9 MHz, 9.6 MHz, 9.4 MHz, 9.1 MHz, 8.9 MHz, and 8.7 MHz, can be set.

Note that in FIG. 9, an example of a TS clock signal of the related art is illustrated in the left upper portion. From the top, an operating clock signal indicated as CK, a parallel clock signal indicated as parallel, and a serial clock signal indicated as serial are written. Furthermore, an example of a TS clock signal in which the present technique has been applied is illustrated in the left lower portion. From the top, an operating clock signal illustrated as CK, a parallel clock signal of pattern A illustrated as parallel A, and a serial clock signal of pattern A illustrated as serial A are written. Furthermore, below the above, a parallel clock signal of pattern B illustrated as parallel B, and a serial clock signal of pattern B illustrated as serial B are written.

Furthermore, in the above, an example is given in which in smoothing the parallel clock signal, the clock width Ddiv is separated into an integer section and a decimal section, and in accordance with the size of the decimal section, adjustment is performed on the integer section by adding the count value of the operating clock signal; however, similar to the process of the serial clock signal, the clock width Ddiv may be obtained as a quotient and its remainder, and in accordance with the remainder, adjustment may be performed on the integer section that is to be the quotient by adding the count value of the operating clock. Furthermore, in a similar manner, in smoothing the serial clock signal, the clock width Mdiv may be separated into an integer section and a decimal section, and in accordance with the size of the decimal section, adjustment may be performed on the count value of the operating clock signal with respect to the integer section. Furthermore, in the above, an example is given in which adjustment is performed on both the serial clock signal and the parallel clock signal by adding the count value of the operating clock number of the integer section; however, adjustment may be performed by subtraction.

As described above, according to the present technique, a serial clock and a parallel clock that corresponds to a higher resolution that has, with respect to the TS bit rate, a higher resolution and that is closer to the TS bit rate can be output.

Incidentally, the above series of processes can, for example, be executed by hardware, or can be executed by software. In the case where the series of processes is executed by software, a program configuring this software is installed in a computer included in dedicated hardware, or a general-purpose personal computer which can execute various functions when various programs are installed, etc., from a recording medium.

Figure 10:
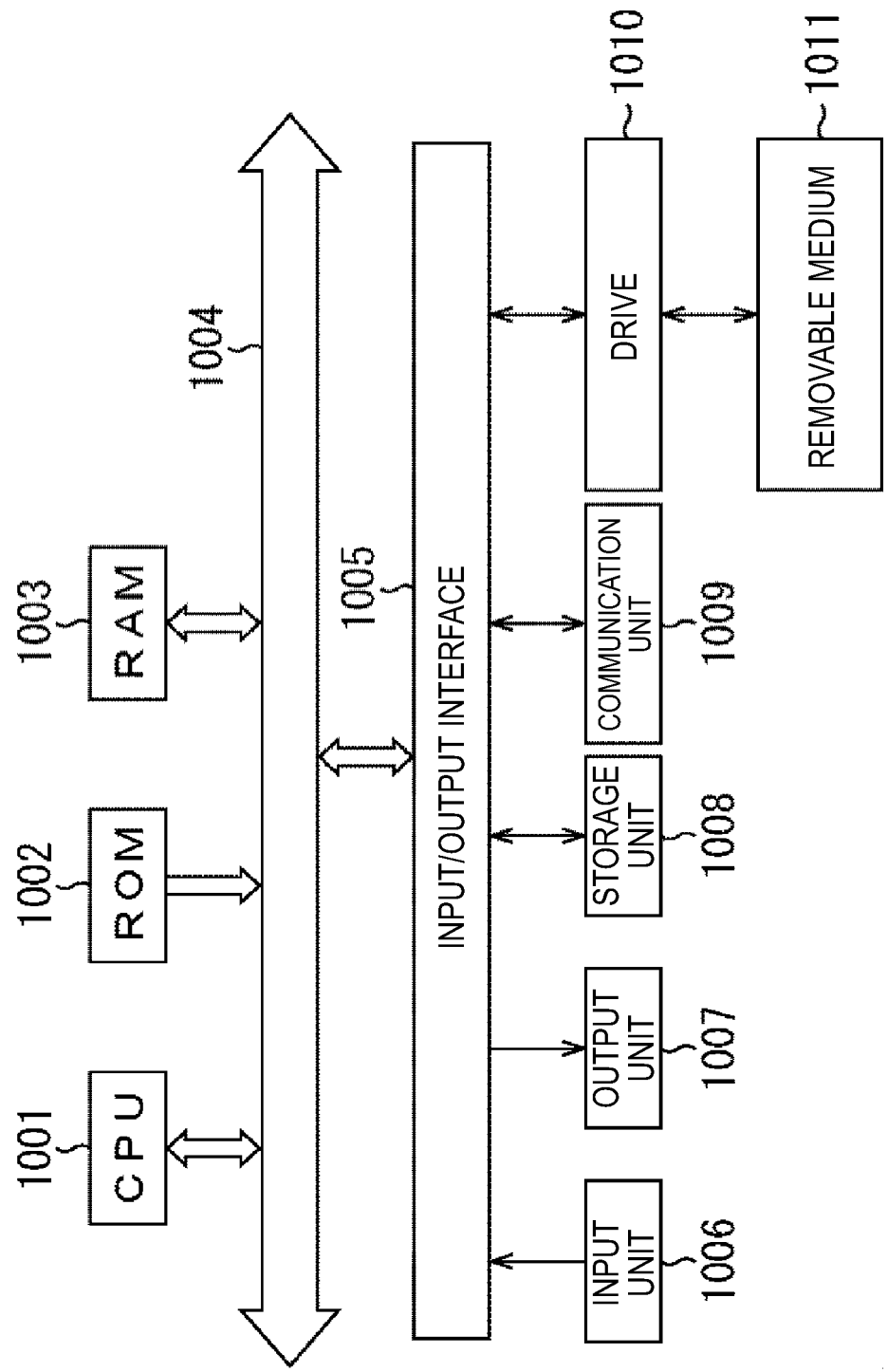
FIG. 10 is a diagram for describing an exemplary configuration of a general-purpose personal computer.

FIG. 10 shows an example configuration of a general-purpose personal computer. The computer includes a CPU (Central Processing Unit) 1001. An input/output interface 1005 is connected to the CPU 1001 through a bus 1004. A ROM (Read Only Memory) 1002 and a RAM (Random Access Memory) 1003 are connected to the bus 1004.

An input unit 1006 including an input device, such as a keyboard, a mouse, etc., which is used by the user to input an operation command, an output unit 1007 which outputs a process operation screen or an image of a process result to a display device, a storage unit 1008 including a hard disk drive etc. which stores a program or various items of data, and a communication unit 1009 including a LAN (Local Area Network) adaptor etc. which performs a communication process through a network typified by the Internet, are connected to the input/output interface 1005. Also, connected is a drive 1010 which reads and writes data from and to a removable medium 1011, such as a magnetic disk (including a flexible disk), an optical disk (including a CD-ROM (Compact Disc-Read Only Memory) and a DVD (Digital Versatile Disc)), an magneto-optical disk (including an MD (Mini Disc)), or a semiconductor memory, etc.

The CPU 1001 executes various processes according to a program stored in the ROM 1002 or a program which is read from the removable medium 1011, such as a magnetic disk, an optical disk, a magneto-optical disk, or a semiconductor memory, etc., is installed in the storage unit 1008, and is loaded from the storage unit 1008 to the RAM 1003. The RAM 1003 also stores data which is required when the CPU 1001 executes various processes, etc., as appropriate.

In the computer configured as described above, the CPU 1001 loads a program that is stored, for example, in the storage unit 1008 onto the RAM 1003 via the input/output interface 1005 and the bus 1004, and executes the program. Thus, the above-described series of processing is performed.

Programs to be executed by the computer (the CPU 1001) are provided being recorded in the removable medium 1011 which is a packaged medium or the like. Also, programs may be provided via a wired or wireless transmission medium, such as a local area network, the Internet or digital satellite broadcasting.

In the computer, by inserting the removable medium 1011 into the drive 1010, the program can be installed in the storage unit 1008 via the input/output interface 1005. Further, the program can be received by the communication unit 1009 via a wired or wireless transmission medium and installed in the storage unit 1008. Moreover, the program can be installed in advance in the ROM 1002 or the storage unit 1008.

It should be noted that the program executed by a computer may be a program that is processed in time series according to the sequence described in this specification or a program that is processed in parallel or at necessary timing such as upon calling.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

An embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

Further, each step described by the above-mentioned flow charts can be executed by one apparatus or by allocating a plurality of apparatuses.

In addition, in the case where a plurality of processes are included in one step, the plurality of processes included in this one step can be executed by one apparatus or by sharing a plurality of apparatuses.

Additionally, the present technique may also be configured as below.

(1)

A signal processing device including:
a valid clock width calculation unit configured to calculate a valid clock width corresponding to a bit rate of a valid section in which a transport stream (TS) packet exists; and
a TS clock signal generation unit configured to generate, on a basis of the valid clock width calculated by the valid clock width calculation unit, a TS clock signal by combining clocks with different frequency dividing rates.

(2)

The signal processing device according to (1),
wherein the TS clock signal generation unit includes
a parallel clock signal generation unit configured to generate, on a basis of the valid clock width, a parallel clock signal by combining the clocks with different frequency dividing rates, and
a serial clock signal generation unit configured to generate, on a basis of a parallel clock width of a level H section or a level L section of a parallel clock signal that has been generated by the parallel clock signal generation unit, a serial clock signal by combining the clocks with different frequency dividing rates.

(3)

The signal processing device according to (1) or (2),
wherein, on a basis of a value of a decimal section of a clock number of an operating clock signal indicating the valid clock width, the parallel clock signal generation unit generates a parallel clock signal by combining a clock signal of a clock number corresponding to an integer section of the clock number of the operating clock signal and a clock signal in which a clock number of a predetermined integer is added to or subtracted from the integer section of the clock number of the operating clock signal, and
wherein, on a basis of a remainder obtained when a clock number of an operating clock signal of a parallel clock width of a level H section or a level L section of a parallel clock signal that has been generated by the parallel clock signal generation unit is divided by a predetermined integer, the serial clock signal generation unit generates a serial clock signal by combining a clock signal of a clock number that is to be an integer section of a quotient obtained when the clock number of the operating clock signal of the parallel clock width of the level H section or the level L section of the parallel clock signal is divided by the predetermined integer, and a clock signal of a clock number in which a clock number of a predetermined integer is added to or subtracted from the integer section of the quotient obtained when the clock number of the operating clock signal of the parallel clock width of the level H section or the level L section of the parallel clock signal is divided by the predetermined integer.

(4)

A signal processing method including the steps of:
performing valid clock width calculation processing of calculating a valid clock width corresponding to a bit rate of a valid section in which a transport stream (TS) packet exists; and
performing TS clock signal generation processing of generating, on a basis of the valid clock width calculated by the valid clock width calculation processing, a TS clock signal by combining clocks with different frequency dividing rates.

(5)

A program configured to cause a computer to execute processing including:
a valid clock width calculation step of calculating a valid clock width corresponding to a bit rate of a valid section in which a transport stream (TS) packet exists; and
a TS clock signal generation step of generating, on a basis of the valid clock width calculated by the valid clock width calculation step, a TS clock signal by combining clocks with different frequency dividing rates.

REFERENCE SIGNS LIST 10 antenna
20 receiver
21 demodulation unit
22 FEC unit
23 selector
24 smoothing unit
25 processing module
26, 27 clock generation unit
51 storage unit
52 delay unit
53, 54 count unit
55 clock width calculation unit
56 generation unit
57 output control unit
61 parallel unit
62 count unit
63 clock width calculation unit
64 serial unit
71 integer section
72 decimal section
73 parallel adjustment section
81 integer section
82 remainder section
83 serial adjustment section

The invention claimed is:

1. A signal processing method comprising:
performing, using a signal processing device, valid clock width calculation processing of calculating a valid clock width corresponding to a bit rate of a valid section in which a transport stream packet exists; and
performing, using the signal processing device, clock signal generation processing of generating, on a basis of the valid clock width calculated, a clock signal by combining clocks with different frequency dividing rates.

2. A non-transitory computer readable medium stored therein instructions, when executed by the signal processing device, allow the signal processing device to perform the signal processing method of claim 1.

3. The signal processing method according to claim 1, wherein the valid section clock width is a shortest time period from an antecedent transition of the transport stream clock signal to a subsequent transition of the transport stream clock signal.

4. The signal processing method according to claim 3, wherein the antecedent transition is a transition of the transport stream clock signal from a logic level to a different logic level that occurs before the subsequent transition.

5. The signal processing method according to claim 4, wherein the subsequent transition is a next transition of the transport stream clock signal from the logic level to the different logic level that occurs after the antecedent transition.

6. The signal processing method according to claim 1, further comprising:
generating a parallel clock signal by combining the clocks with the different frequency dividing rates.

7. The signal processing method according to claim 6, further comprising:
converting the valid section clock width into the parallel clock signal.

8. The signal processing method according to claim 1, further comprising:
generating a serial clock signal by combining the clocks with the different frequency dividing rates.

9. The signal processing method according to claim 8, further comprising:
converting a clock width of the parallel clock signal into the serial clock signal.

10. A signal processing device comprising:
clock width calculation circuitry configured to electronically obtain a valid section clock width that corresponds to a bit rate of a valid section in which a transport stream packet exists; and
clock signal generation circuitry configured to combine clocks with different frequency dividing rates to generate a transport stream clock signal, the clock signal generation circuitry being configured to use the valid section clock width to generate the transport stream clock signal.

11. The signal processing device according to claim 10, wherein the valid section clock width is a shortest time period from an antecedent transition of the transport stream clock signal to a subsequent transition of the transport stream clock signal,
wherein the antecedent transition is a transition of the transport stream clock signal from a logic level to a different logic level that occurs before the subsequent transition, the subsequent transition is a next transition of the transport stream clock signal from the logic level to the different logic level that occurs after the antecedent transition.

12. The signal processing device according to claim 10, wherein the clock signal generation circuitry includes a parallel clock signal generation circuitry configured to generate a parallel clock signal by combining the clocks with the different frequency dividing rates, the parallel clock signal generation circuitry is configured to use the valid section clock width to generate the parallel clock signal.

13. The signal processing device according to claim 12, wherein the clock signal generation circuitry includes a serial clock signal generation circuitry configured to generate a serial clock signal by combining the clocks with the different frequency dividing rates, the serial clock signal generation circuitry is configured to use a clock width of the parallel clock signal to generate the serial clock signal.

* * * * *